(12) United States Patent
Gualtieri

(10) Patent No.: US 7,092,840 B2
(45) Date of Patent: Aug. 15, 2006

(54) HIGH TEMPERATURE RESONANT TRANSMISSION LINE SENSOR AND METHODS

(75) Inventor: Devlin M. Gualtieri, Ledgewood, NJ (US)

(73) Assignee: Honeywell International, Inc., Morristown, NJ (US)

( * ) Notice: Subject to any disclaimer, the term of this patent is extended or adjusted under 35 U.S.C. 154(b) by 163 days.

(21) Appl. No.: 10/789,693

(22) Filed: Feb. 26, 2004

(65) Prior Publication Data

US 2005/0192774 A1    Sep. 1, 2005

(51) Int. Cl.
*G01C 9/00* (2006.01)

(52) U.S. Cl. .................. 702/150; 324/633
(58) Field of Classification Search ........... 702/150
See application file for complete search history.

(56) References Cited

U.S. PATENT DOCUMENTS

| | | | |
|---|---|---|---|
| 3,859,619 A | 1/1975 | Ishihara et al. | |
| 4,092,579 A | 5/1978 | Weit | |
| 4,238,781 A | 12/1980 | Vercellotti et al. | |
| 4,477,810 A | 10/1984 | Tanaka et al. | |
| 4,569,365 A | 2/1986 | Namand et al. | |
| 4,821,769 A | 4/1989 | Mills et al. | |
| 4,879,552 A | 11/1989 | Arai et al. | |
| 5,012,673 A | 5/1991 | Takano et al. | |
| 5,193,568 A | 3/1993 | Eissenberg et al. | |
| 5,204,674 A | 4/1993 | Holben | |
| 5,315,865 A | 5/1994 | Hornfeck et al. | |
| 5,376,888 A * | 12/1994 | Hook | 324/643 |
| 5,497,098 A * | 3/1996 | Heil et al. | 324/637 |
| 5,681,990 A | 10/1997 | Hampo et al. | |
| 6,218,803 B1 | 4/2001 | Montagu et al. | |
| 6,382,246 B1 | 5/2002 | Mori et al. | |
| 6,445,191 B1 | 9/2002 | Trummer | |
| 6,452,404 B1 | 9/2002 | Moeller et al. | |
| 6,505,509 B1 * | 1/2003 | Gualtieri | 73/290 V |
| 2001/0005134 A1 | 6/2001 | Friedel et al. | |
| 2001/0042566 A1 | 11/2001 | Mori et al. | |

FOREIGN PATENT DOCUMENTS

WO    WO 93/13388 A    7/1993
WO    WO 01/67053 A    9/2001

OTHER PUBLICATIONS

Sears, Zemansky and Young, "University Physics", 1987, Seventh Edition, Addison-Wesley.*
PCT International Search Report PCT/US2005/005992, Jul. 12, 2005.
Y. N. Pchelnikov, D.S. Nyce, "Slow-Wave Structures-Based Method of Measurements" IEEE Transactions on Instrumentation and Measurement, vol. 51, No. 5, Oct. 2002.

* cited by examiner

*Primary Examiner*—John Barlow
*Assistant Examiner*—Stephen J. Cherry
(74) *Attorney, Agent, or Firm*—Ingrassia Fisher & Lorenz

(57) ABSTRACT

A position sensing system uses a resonant transmission line having a moveable dielectric as a position sensor. The system includes circuitry that supplies a drive signal to the resonant transmission line, which reflects the drive signal. Based on a standing wave signal, which is generated from the drive signal and the reflected drive signal, the circuitry determines the frequency of the sensor drive signal relative to a resonant frequency of the resonant transmission line, and adjusts the sensor drive signal frequency to match a resonant frequency of the transmission line. The circuitry determines the relative position of the moveable dielectric based on the adjusted sensor drive signal frequency.

27 Claims, 10 Drawing Sheets

HIGH TEMPERATURE RESONANT TRANSMISSION LINE SENSOR AND METHODS

FIELD OF THE INVENTION

The present invention relates to sensors and, more particularly, to a resonant transmission line sensor that can sense both position and temperature, and thereby supply a temperature-compensated position signal.

BACKGROUND OF THE INVENTION

Various systems include components, such as valves, that may be automatically moved to one or more positions, under the control of one or more other system components, during system operation. These components may be moved periodically or in response to certain conditions that may occur within the system. In either case, it is preferable to know that the component being moved has actually been, or is being, moved from its initial position to its desired position. It is also preferable to know that the component remains in the desired position once it has been moved. Thus, numerous systems and methods have been developed to sense, and supply signals representative of, the position of various moveable components.

Some examples of position sensors that have been developed include potentiometers, rotary variable differential transformers (RVDTs), linear variable differential transformers (LVDTs), capacitance position sensors, and Hall effect sensors, just to name a few. Although these, and other, known types of position sensors are generally reliable, each suffers certain drawbacks. Most notably, when many of the known position sensors are used in a relatively high temperature environment (e.g., 950° F. or more), the accuracy of the position sensor may deteriorate.

One example of a system in which a position sensor may be exposed to relatively high temperatures is an aircraft gas turbine engine. Gas turbine engines include various components, such as valves, that may be exposed to such high temperatures. Proper engine operation may, in many instances, rely on knowing the position of these components. However, if the accuracy of the position sensor suffers at high temperatures, the engine may not operate properly and/or most efficiently. Various systems and methods have been developed to compensate sensor inaccuracies for temperature. However, these systems and methods can be complex and relatively costly to implement.

Hence, there is a need for a position sensing system that can accurately determine, and provide a signal representative of, the position of one or more components in a relatively high temperature environment, that is relatively easy and less costly to implement. The present invention addresses one or more of these needs.

SUMMARY OF THE INVENTION

The present invention provides a position sensing system that can accurately determine, and provide a signal representative of, the position of one or more components in a relatively high temperature environment.

In one embodiment, and by way of example only, a position sensing system includes a variable frequency signal source, a resonant transmission line sensor, a summing circuit, a control circuit, and a position determination circuit. The variable frequency signal source is coupled to receive a frequency control signal and is operable, in response thereto, to supply a sensor drive signal. The resonant transmission line sensor has one or more resonant frequencies, and includes a conductor and a moveable dielectric at least partially surrounding the conductor. The conductor has a driven end coupled to receive the sensor drive signal and a terminal end configured to reflect the sensor drive signal to thereby supply a reflected signal to the driven end. The moveable dielectric is configured to receive a drive force and, upon receipt thereof, to move the dielectric to a position and thereby vary the one or more resonant frequencies of the resonant transmission line sensor. The summing circuit is coupled to receive the sensor drive signal and the reflected signal and is operable, in response thereto, to supply a standing wave signal having an amplitude that varies with the one or more resonant frequencies of the transmission line sensor. The control circuit is coupled to receive the standing wave signal and is operable, in response thereto, to determine the sensor drive signal frequency relative to at least one of the transmission line sensor resonant frequencies, and to supply the frequency control signal to the variable frequency source, to thereby adjust the sensor drive signal frequency to substantially match at least one of the resonant transmission line sensor resonant frequencies. The position determination circuit is coupled to receive the adjusted sensor drive signal and is operable, in response thereto, to determine the position of the moveable dielectric.

In another exemplary embodiment, a method of determining a position of moveable component includes moving a dielectric that is disposed within a resonant transmission line adjacent a sensor conductor in response to movement of the moveable component, whereby movement of the dielectric varies a resonant frequency of the resonant transmission line. A sensor drive signal having a frequency is supplied to the resonant transmission line conductor, to thereby produce a reflected signal. The sensor drive signal and the reflected signal are summed to produce a standing wave signal. The sensor drive signal frequency is determined relative to a resonant frequency of the transmission line, and is adjusted to substantially match a resonant frequency of the transmission line. The position of the moveable component is determined, based at least in part on the adjusted sensor drive signal frequency.

In yet another exemplary embodiment, a resonant transmission line sensor includes a first conductive substrate, a second conductive substrate, a sensor substrate, a sensor conductor, and a moveable dielectric. The sensor substrate has at least a first and second surface, and is disposed between the first and second conductive substrates. The sensor conductor is coupled to the sensor substrate first surface. The movable dielectric is disposed between the first conductive substrate and the sensor conductor, and is configured to receive a drive force and, upon receipt thereof, to move relative to the sensor conductor.

Various other position sensing and temperature sensing systems are disclosed, as well as methods of making sensors.

Other independent features and advantages of the preferred position sensor system will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a particular type of valve, or even to use in a valve. Thus, although the present embodiment is, for convenience of explanation, depicted and described as being used to determine the position of a valve, it will be appreciated that it can be implemented to determine the position of various other components, and in various other systems and environments.

Figure 1:
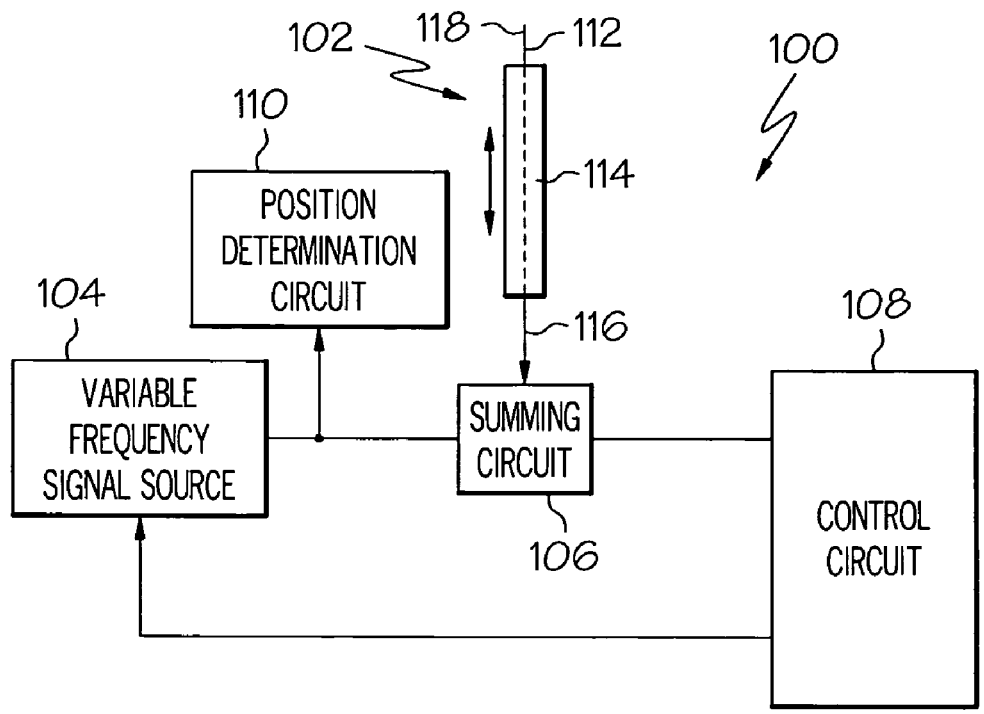
FIG. 1 is a functional schematic block diagram of a position sensor system according to an exemplary embodiment of the present invention.

Turning now to the description, and with reference first to FIG. 1, a functional schematic block diagram of a position sensor system is shown. The system 100 includes a sensor 102, a variable frequency signal source 104, a summing circuit 106, a control circuit 108, and a position determination circuit 110. The sensor 102 is a resonant transmission line that includes a conductor 112, and a moveable dielectric 114 that at least partially surrounds the conductor 112. The sensor 102 may be any one of numerous types of resonant transmission lines including, for example, coaxial transmission line, twin lead transmission lines, and stripline transmission lines. However, in a particular preferred embodiment, the sensor 102 is an embedded stripline, having a driven end 116 and a terminal end 118. As will be described more fully below, the conductor driven end 116 is coupled to receive a sensor drive signal from the variable frequency source 104, and the conductor terminal end 118 reflects the sensor drive signal back toward the driven end 116, producing a standing wave signal voltage at the driven end 116. A schematic representation of an embedded stripline transmission line 200 is shown in FIG. 2, and will now be described in more detail.

Figure 2:
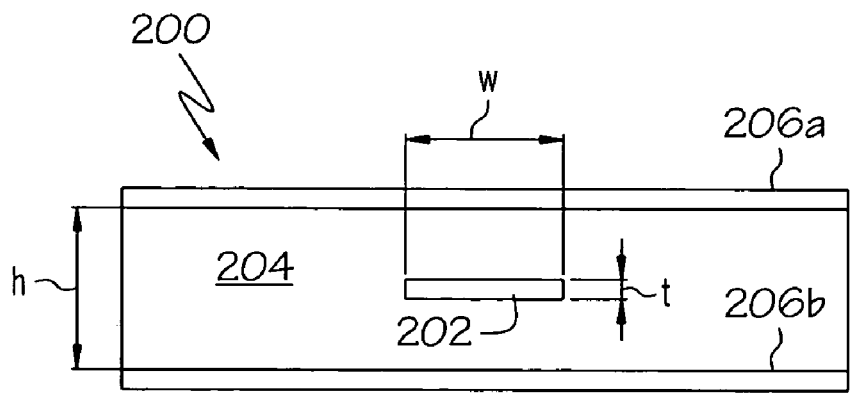
FIG. 2 is a schematic representation of an exemplary embedded stripline transmission line.

An embedded stripline 200 is a resonant transmission line that includes a conductor 202, a dielectric 204, and a pair of ground planes 206a, 206b. The conductor 202 is embedded in, or otherwise surrounded by, the dielectric 204. The dielectric 204 in turn is disposed between the ground planes 206a, 206b, which shield the conductor 202 from stray signals. As is generally known, the characteristic impedance ($Z_o$) of an embedded stripline is approximated by the following equation:

$$Z_o = 60(\epsilon)^{-1/2} \ln[(4h/(0.67\pi w(0.8+t/w))], \quad \text{(Eq. 1)}$$

where ($\epsilon$) is the dielectric constant, and the remaining parameters are as shown in FIG. 2. When the thickness (t) of the conductor 202 is sufficiently small, Equation 1 can simplified to the following:

$$Z_o = 60(\epsilon)^{-1/2} \ln[2.38(h/w)]. \quad \text{(Eq. 2)}$$

Figure 3:
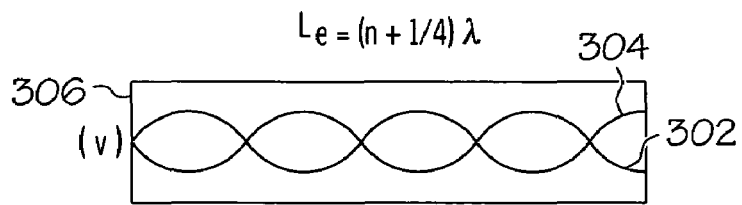
FIG. 3 is a simplified schematic representation of an exemplary resonant transmission line showing incident and reflected waves when the electrical length of the transmission line is an (n+¼)-multiple of the wavelength of the incident wave.
Figure 4:
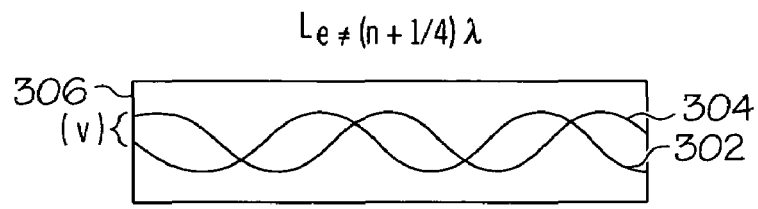
FIG. 4 is a simplified schematic representation of an exemplary resonant transmission line showing incident and reflected waves when the electrical length of the transmission line is not an (n+¼)-multiple of the wavelength of the incident wave.

As is also generally known, whenever a transmission line, such as the embedded stripline 200 described above, is terminated in an impedance that does not match the characteristic impedance ($Z_o$) of the transmission line, the transmission line will reflect an incident signal injected into it. If the incident signal is a continuous signal, such as a radio frequency (RF) signal, the incident and reflected signals mix, producing what is known as a standing wave signal. As shown in FIG. 3, and as is generally known, when the electrical length ($L_e$) of the transmission line 200 is an (n+¼) multiple of the wavelength (λ) of the incident signal, the incident 302 and reflected 304 signals destructively interfere at the driven end 306 of the transmission line 200, and the standing wave signal voltage (V) is substantially zero at the driven end 306. Conversely, as shown in FIG. 4, whenever the electrical length ($L_e$) varies from an (n+¼) wavelength multiple, the incident 302 and reflected 304 signals do not fully destructively interfere, and a non-zero standing wave signal voltage (V) is present at the driven end 306. When the former situation exists, that is the electrical length ($L_e$) of the transmission line 200 is an (n+¼) multiple of the wavelength (λ) of the incident signal, the frequency of the incident signal matches the resonant frequency of the transmission line.

Figure 5:
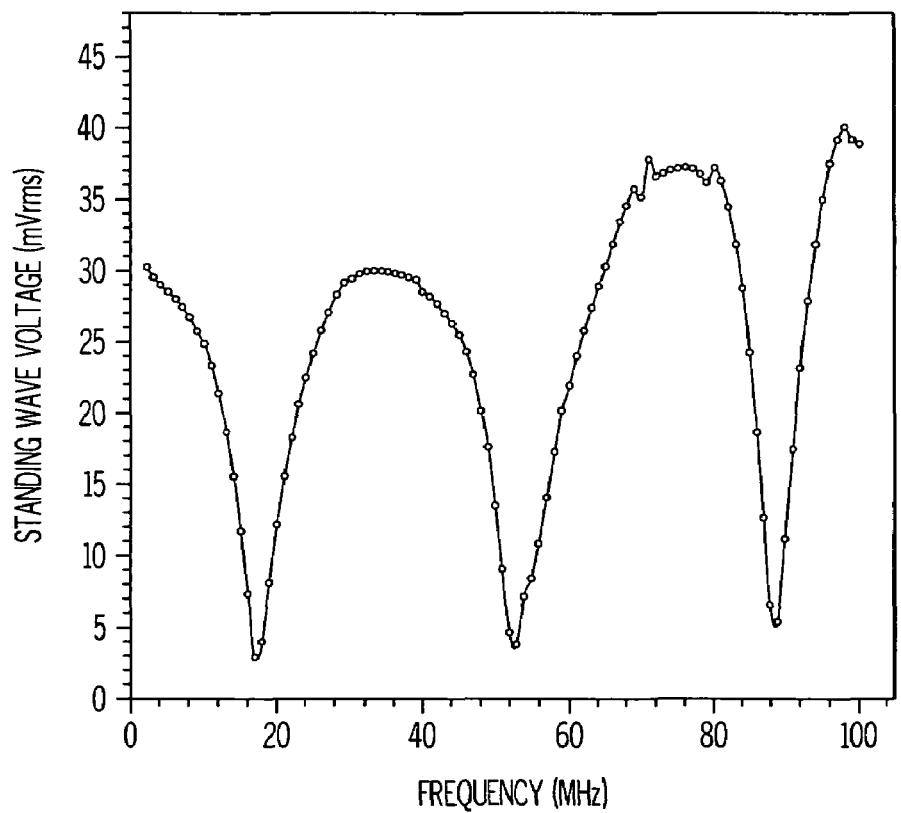
FIG. 5 is graph depicting an exemplary resonant transmission line standing wave response in the frequency domain.

The standing wave signal voltage (V) versus transmission line electrical length ($L_e$) is known as the standing wave response of a transmission line. The standing wave response may be depicted in either the time domain, such as shown in FIGS. 3 and 4, or in the frequency domain. An exemplary depiction of a transmission line standing wave response in the frequency domain is illustrated in FIG. 5, and shows nodes 502, 504, 506 occurring at the resonant frequencies of the transmission line. The first of these so-called node frequencies 502 coincides with the principle resonant frequency of the transmission line, whereas the subsequent nodes coincide with multiples of the transmission line resonant frequency.

Figure 6:
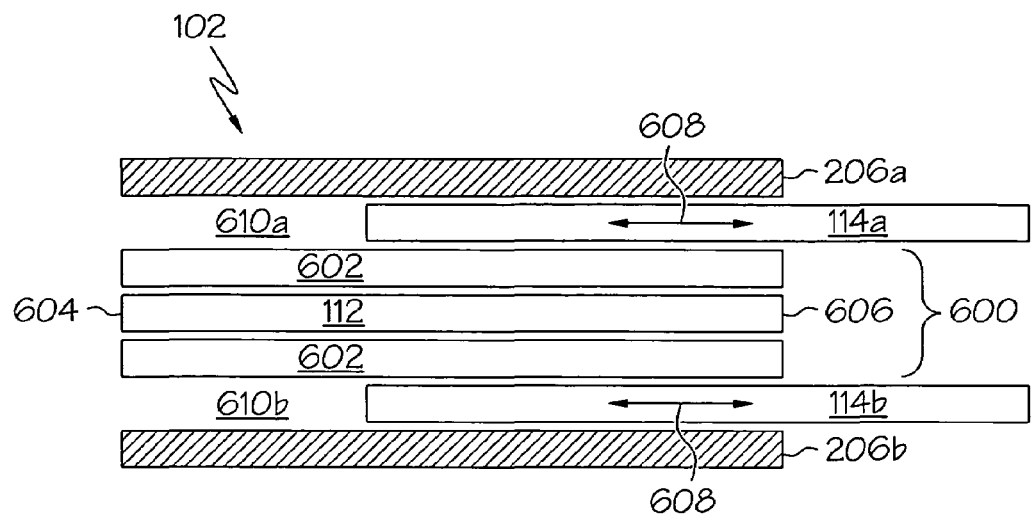
FIG. 6 is a simplified schematic representation an exemplary physical implementation of an embedded stripline resonant transmission line sensor that may be used with the system of FIG. 1.

From the foregoing it is seen that if the dielectric constant ($\epsilon$) of a transmission line is varied by, for example, including a moveable dielectric 204 in the stripline 200, the impedance (Z) of the stripline 200 and the speed of light, or signal propagation speed, in the stripline 200, and thus the electrical length ($L_e$) and resonant frequency of the stripline 200 will vary accordingly. Hence, the stripline 200 constructed with a moveable dielectric 204 can be used as a sensor. A simplified schematic representation of the construction of a physical implementation of an embedded stripline resonant transmission line sensor, which is preferably used as the sensor 102 in the system 100 depicted in FIG. 1, is illustrated in FIG. 6, and will now be described in more detail.

The sensor 102 includes an embedded stripline module 600, and the previously mentioned moveable dielectric 114. The stripline module 600 includes the conductor 112, which is embedded in a fixed dielectric 602. It will be appreciated that the sensor 102 could be implemented without the fixed dielectric 602, but is preferably included to ease in the construction and operation of the sensor 102. The moveable dielectric 114, at least in the depicted embodiment, is implemented as two separate moveable dielectrics 114a, 114b, disposed on either side of the stripline module 600, though it will be appreciated that it could be implemented as a single moveable dielectric on either side of the stripline module 600. The sensor 102 additionally includes the previously described ground planes 206a, 206b to shield the conductor 112 from stray signals. As indicated by the arrows 608 in FIG. 6, the moveable dielectrics 114a, 114b, upon receipt of a drive force, move into and out of spaces 610a, 610b between the stripline module 600 and the ground planes 206a, 206b, thereby varying the impedance (Z) and signal propagation speed, and thus the resonant frequency, of the sensor 102.

It will be appreciated that the material selected as the dielectric, for both the moveable 114a, 114b and fixed 602 dielectrics, may be any one of numerous dielectric materials. Preferably, the dielectric material will have a dielectric constant that is sufficiently greater than air, so that the transmission line sensor 102 exhibits the desired reflection characteristics to an injected signal (i.e., sufficient reduction is speed of light in the transmission line). In addition, the selected material should be stable at the operating temperature of the environment in which it will be placed during operation. Examples of dielectric materials that could be used include, without limitation, glass, quartz, mica, nylon, polyethylene, and mylar. In a particular preferred embodiment, however, the dielectric material is alumina. A particular actual physical implementation of the stripline module 600, its physical construction, and a preferred method of manufacturing the conductor the stripline module 600, will be described further below. Moreover, particular actual physical implementation of the embedded stripline resonant transmission line sensor 102 will also be described further below. Initially, however, reference should be returned to FIG. 1, while the description of the remaining portions of the sensor system 100 is provided.

The variable frequency source 104 is configured to generate and supply a radio frequency (RF) sensor drive signal. The particular frequency at which the variable frequency source 104 supplies the sensor drive signal, is based on a control signal supplied from the control circuit 108. As will be described in more detail further below, the control supplied from the control circuit 108, and thus the particular RF frequency at which the variable frequency source 104 generates and supplies the sensor drive signal, depends on the impedance of, and signal propagation in, the transmission line sensor 102. In particular, the sensor drive signal frequency supplied by the variable frequency source 104 preferably matches the resonant frequency of the transmission line sensor 102. The variable frequency source 104 may be configured to generate and supply the sensor drive signal in any one of the numerous RF frequency bands (e.g., VLF, LF, MF, HF, etc). Preferably, however, the variable frequency source 104 is configured to generate the sensor drive signal in the HF (high frequency) frequency band (e.g., 3–30 MHz) or the VHF (very high frequency) frequency band (e.g., 30–300 MHz). Lower frequencies are preferable when low signal loss in associated connecting cables is desirable, and higher frequencies are preferably when a small sensor size is desireable.

The sensor drive signal generated by the variable frequency source 104 is supplied to the sensor 102 via the summing circuit 106. In addition to receiving the sensor drive signal from the variable frequency source 104, the summing circuit also receives the reflected signal from the sensor 102. The summing circuit 106 sums these two signals together and supplies a standing wave signal representative of the standing wave signal voltage (V) at the driven end 116 of the sensor conductor 112.

The standing wave signal from the summing circuit 106 is supplied to the control circuit 108. The control circuit 108 processes the standing wave signal, and determines the frequency of the sensor drive signal supplied to the sensor 102 relative to the resonant frequency of the transmission line sensor 102. Based on this determination, the control circuit 108 supplies the appropriate frequency control signal to the variable frequency source 104. In particular, as was previously mentioned, the control circuit 108 supplies a frequency control signal that will cause the variable frequency source 104 to supply the sensor drive signal at the resonant frequency of the transmission line sensor 102.

The position determination circuit 110 is coupled to the variable frequency source 104, and also receives the sensor drive signal supplied thereby. The position determination circuit 110 processes the sensor drive signal and, based on the frequency of this signal, supplies a signal representative of the position of the moveable dielectric.

As was previously mentioned, the control circuit 108 senses the frequency of the sensor drive signal supplied by the variable frequency source 104, and determines the sensor drive signal frequency relative to the resonant frequency of the resonant transmission line sensor 102. In response, the control circuit supplies the control signal to the variable frequency source 104 so that it supplies the sensor drive signal at the resonant frequency of the resonant transmission lines sensor 102. More specifically, the control circuit 108 determines whether the sensor drive signal is at, below, or above the resonant frequency of the resonant transmission line sensor 102, and supplies the appropriate control signal based on this determination. To do so, the control circuit 108 determines the first derivative of the amplitude of the standing wave signal with respect to frequency.

Various circuits and individual component configurations could be used to implement each of the circuit functionalities described above. Moreover, these various circuits and individual component configurations could also be configured to implement the above-described functions in any one of numerous ways. With reference now to FIGS. 7–11, a particular preferred circuit configuration, and the methodologies implemented by this circuit configuration, will now be described.

Figure 7:
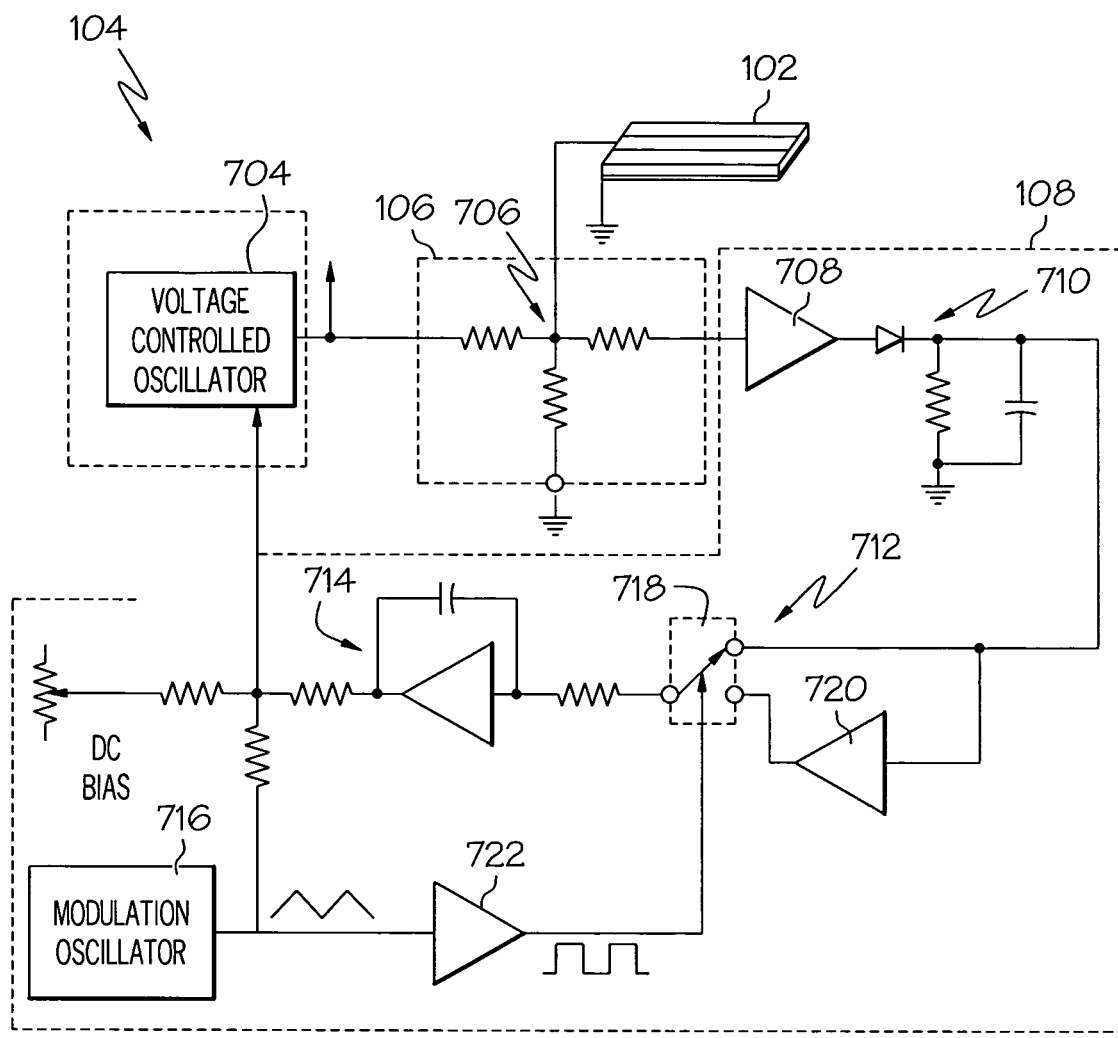
FIGS. 7 and 8 are each functional block diagrams of exemplary circuit configurations that may be used to implement the system of FIG. 1.

Turning first to FIG. 7, it is seen that the variable frequency source 104 is implemented as a variable frequency oscillator circuit, and preferably as a voltage-controlled oscillator (VCO) circuit 704. A VCO circuit, as is generally known, generates an AC signal at a frequency that is based on a control signal supplied to the VCO circuit from an external source. In the depicted embodiment, the control signal, as was mentioned above, is supplied to the VCO circuit 704 from the control circuit 108, a particular preferred circuit configuration of which is described in more detail further below.

The summing circuit 106 is preferably implemented as a resistor "T" network 706, though it will be appreciated that it could be implemented as any one of numerous three-port summing circuit configurations. The resistor "T" network 706 sums the sensor drive signal from the VCO circuit 104 and the signal reflected in the transmission line sensor 102, producing the above-mentioned standing wave signal. In a preferred embodiment, the resistor "T" network 706 is collocated with the resonant transmission line sensor 102. This is done to make the response of the sensor 102 independent of the length of the cables interconnecting the sensor 102 to the circuitry. The resistor "T" network 706 couples the standing wave signal to the control circuit 108, which will now be described in more detail.

In the depicted embodiment, the control circuit 108 is implemented as a lock-in amplifier circuit, and includes an RF amplifier 708, a rectifier and low-pass filter circuit 710, a synchronous detector circuit 712, an integrator circuit 714, and a modulation oscillator circuit 716. The RF amplifier circuit 708 receives and amplifies the standing wave signal supplied from the resistor "T" network 706. The amplified standing wave signal is supplied to the rectifier and low-pass filter circuit 710, which rectifies and smoothes the standing wave signal, and supplies the rectified standing wave signal to the synchronous detector circuit 712.

In the depicted embodiment, the synchronous detector circuit 712 includes an analog switch 718, an inverter 720, and a threshold comparator circuit 722. The analog switch 718 is controlled by a square wave signal supplied from the comparator circuit 722. The comparator circuit 722 is coupled to the modulation oscillator circuit 716, which generates and supplies a modulation signal, preferably in the audio frequency range. The comparator circuit 722, in response to the modulation signal, supplies a switch control signal at the same frequency as the modulation signal frequency. Thus, the position of the analog switch 718 is switched at the modulation signal frequency, and supplies a phase-detected signal to the integrator circuit 714.

The integrator circuit 714 receives the phase-detected signal from the synchronous detector circuit 712, and integrates this signal to produce a phase-detected control signal. The phase-detected control signal is summed with the modulation signal supplied from the modulation oscillator circuit 716, to supply the frequency control signal to the VCO circuit 704. As shown in phantom in FIG. 7, the control circuit 108 may additionally include a bias voltage supply circuit 724. The bias voltage supply circuit, if included, supplies a DC bias voltage, which is additionally summed with the phase-detected control signal and the modulation signal, to produce the frequency control signal that is supplied to the VCO circuit 704.

It was previously mentioned that the control circuit 108 determines the first derivative of the amplitude of the standing wave signal with respect to sensor drive signal frequency, and that this determination is used to supply the appropriate frequency control signal to the variable frequency source 104. This is accomplished by frequency modulating the sensor drive signal supplied by the variable frequency source 104, and synchronously detecting the amplitude of the standing wave signal supplied from the summing circuit. In the above-described circuit implementation, the modulation signal supplied by modulation oscillator circuit 716 is used to frequency modulate the sensor drive signal. Because the frequency modulation alternates between increasing and decreasing the sensor drive signal frequency, the standing wave signal from the resonant transmission line sensor 102 is not only similarly frequency modulated, it is also amplitude modulated.

Figure 10A:
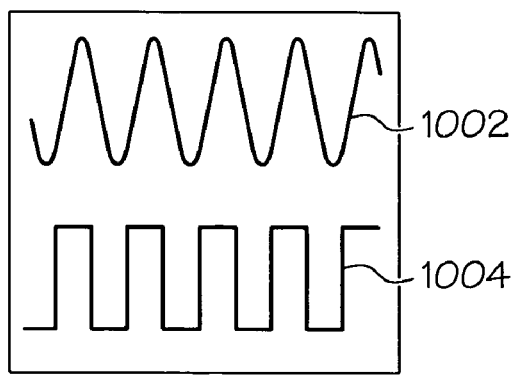
FIGS. 10A and 10B depict signals within the circuit configuration of FIG. 7.
Figure 10B:
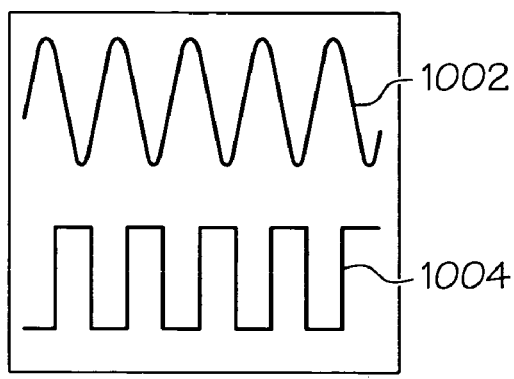

The synchronous detector circuit 712, in combination with the RF amplifier 708, and the low-pass filter circuit 710, synchronously detects the standing wave signal amplitude in phase with the frequency modulation, to produce the phase-detected signal. If the phase-detected signal is in phase with the frequency modulation, which means the amplitude and frequency modulation of the standing wave signal are in phase, then the sensor drive signal frequency is greater than the resonant frequency of the resonant transmission sensor 102 (e.g., the first derivative of the amplitude of the standing wave signal with respect to frequency is positive). This instance is illustrated in FIG. 10A, which shows the phase-detected signal 1002 in phase with the switch control signal 1004 supplied from the comparator circuit 722. Conversely, if the phase-detected signal is 180-degrees out of phase with the frequency modulation, which means the amplitude and frequency modulation of the standing wave signal are 180-degrees out of phase, then the sensor drive signal frequency is less than the resonant frequency of the resonant transmission sensor 102 (e.g., the first derivative of the amplitude of the standing wave signal with respect to frequency is negative). This instance is illustrated in FIG. 10B, which shows the phase-detected signal 1002 180-degrees out of phase with the switch control signal 1004.

It should be understood that it is the polarity of the phase-detected control signal that is output by the integrator circuit 714 that indicates whether the sensor drive signal frequency greater than or less than the resonant frequency of the resonant transmission line sensor 102. Specifically, if the phase-detected control signal is a positive voltage, then the sensor drive signal frequency is greater than the resonant frequency the resonant transmission line sensor 102. Conversely, if the phase-detected control signal is a negative voltage, then the sensor drive signal frequency is less than the resonant frequency of the resonant transmission line sensor 102. In either case, the phase-detected control signal is added to the modulation signal to generate an appropriate frequency control signal that is then supplied to the variable frequency source 104, to bring the sensor drive signal frequency to the resonant frequency of the resonant transmission line sensor 102.

Before describing a specific implementation of the position determination circuit 110, a brief description of the operation of the specific circuit implementations of the variable frequency source 104 and the control circuit 108 described above will first be described. In doing so, reference should be made to FIG. 11, which depicts a portion of the standing wave response 1102, in the frequency domain, of the resonant transmission line sensor 102 near a resonant frequency 1104.

Figure 11:
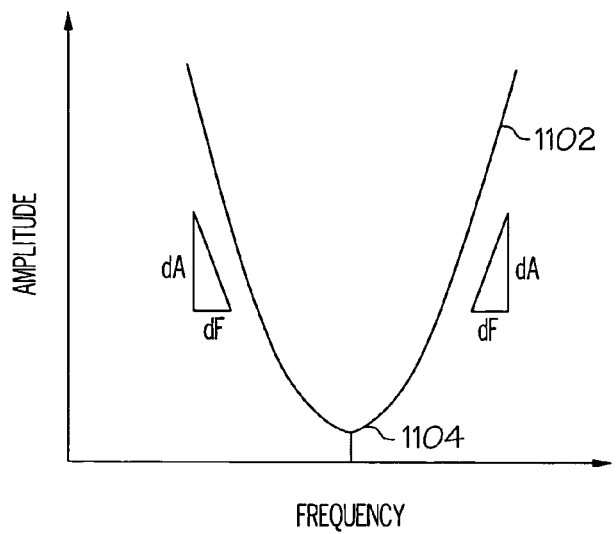
FIG. 11 is a portion of an exemplary resonant transmission line standing wave response in the frequency domain near a resonance node.

As shown in FIG. 11, if the control circuit 108 determines that the frequency of the sensor drive signal is below the resonant frequency 1104, the synchronous detector circuit 712, integrator circuit 714, and modulation oscillator 716 produce a frequency control signal that causes the VCO circuit 704 to increase the frequency of the sensor drive signal to the resonant frequency 1104. Conversely, if the control circuit 108 determines that the frequency of the sensor drive signal is above the resonant frequency 1104, the synchronous detector circuit 712, integrator circuit 714, and modulation oscillator 716 produce a frequency control signal that causes the VCO circuit 704 to decrease the frequency of the sensor drive signal to the resonant frequency 1104.

Figure 8:
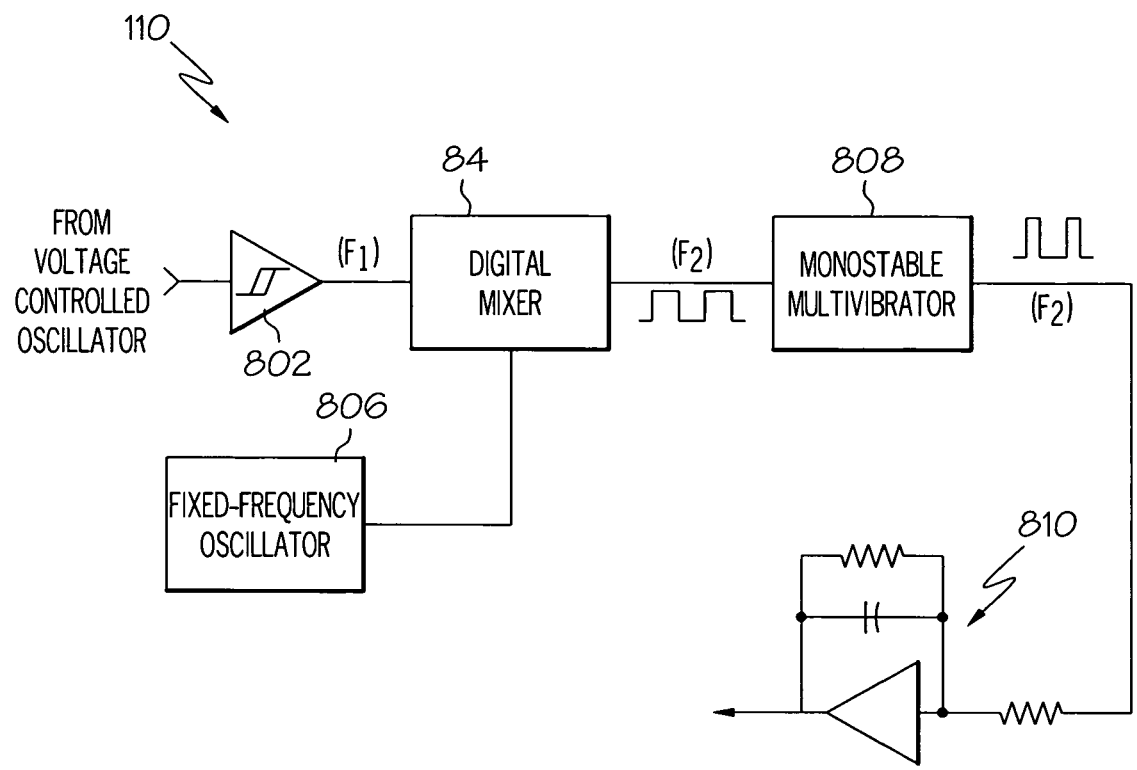

Turning now to a description of the position determination circuit, in a particular preferred embodiment, the position determination circuit 110 is implemented as a frequency-to-voltage converter circuit. As is generally known, a frequency-to-voltage converter circuit converts an AC signal to a DC signal having a voltage magnitude that is proportional to the frequency of the AC signal. Although various circuit configurations could be used to implement this particular preferred function, in the particular preferred implementation, which is shown in FIG. 8, the position determination circuit 110 includes a Schmitt trigger circuit 802, a digital mixer circuit 804, a fixed-frequency oscillator circuit 806, a monostable multivibrator circuit 808, and a signal averaging circuit 810.

The Schmitt trigger circuit 802 receives the sensor drive signal from the VCO circuit 704, and converts it to a square wave signal having a frequency ($F_1$) that matches the sensor drive signal frequency. The digital mixer 804 receives the square wave signal and a fixed-frequency signal supplied by the fixed-frequency oscillator 806, and heterodynes (or mixes) the two signals to convert the square wave signal to a heterodyned signal having a lower frequency ($F_2$). The heterodyned signal is then supplied to the monostable vibrator circuit 808, which supplies a fixed pulse-width signal at the frequency of the heterodyned signal ($F_2$). The signal averaging circuit 801 receives and averages the fixed pulse-width signal, and supplies a DC position signal having a voltage magnitude that is proportional to the heterodyned signal frequency ($F_2$).

Figure 9:
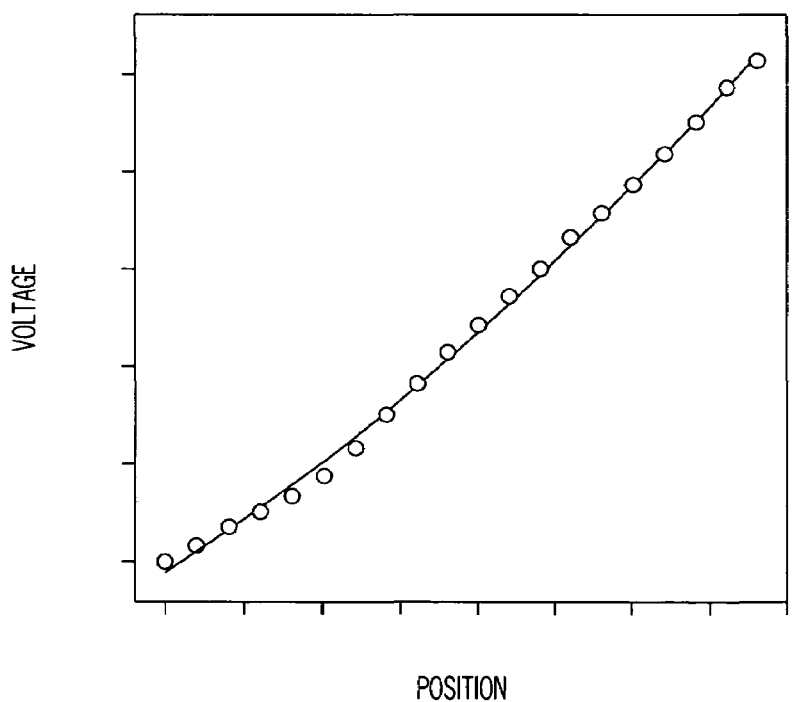
FIG. 9 is a graph depicting an exemplary output voltage versus position response of the system of FIG. 1.

The resonant frequency of the resonant transmission line sensor 102, as was noted above, is based on the position of the moveable dielectric. Moreover, the frequency of the sensor drive signal is adjusted to match the resonant frequency of the resonant transmission line sensor 102. Hence, the heterodyned signal frequency ($F_2$) is representative of the sensor drive signal frequency, and thus the position signal voltage magnitude is representative of the position of the moveable dielectric 114. Thus, by coupling the moveable dielectric 114 to a component, such as a valve, the position sensor system 100 can be used to supply a signal representative of the position of that component. A graph depicting an exemplary output voltage versus position response of the position sensor system 100 is illustrated in FIG. 9.

Figure 12:
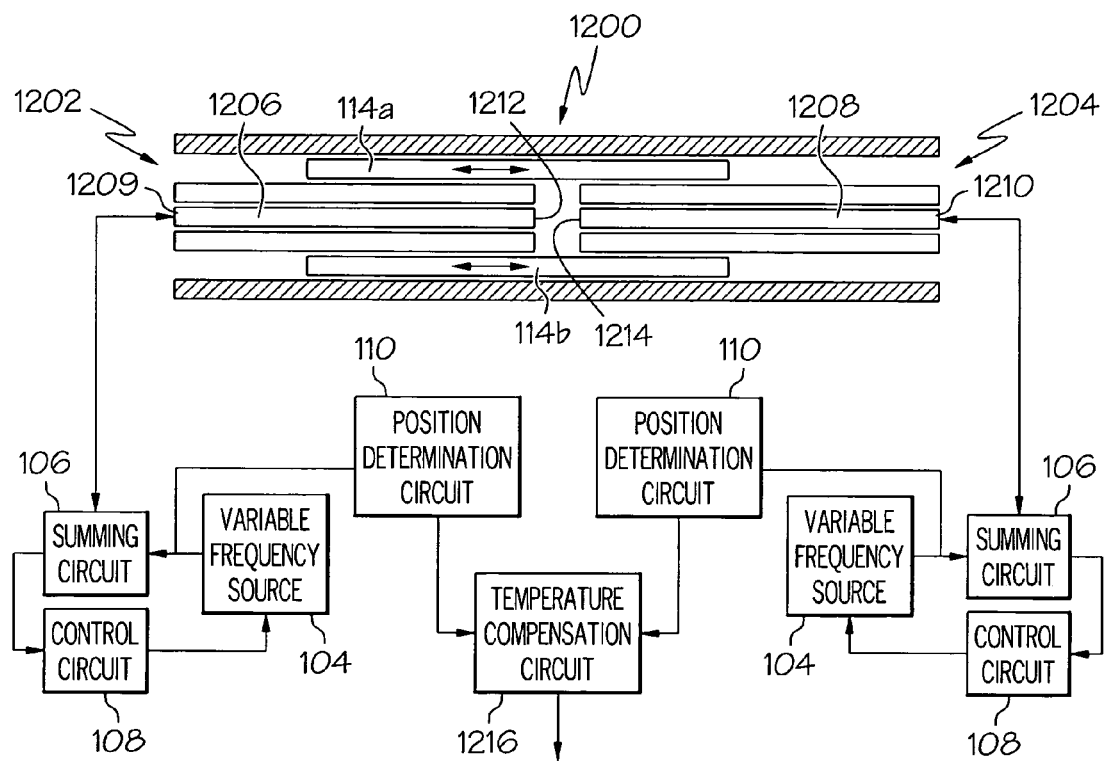
FIG. 12 is a simplified schematic representation of an exemplary physical implementation of an embedded stripline resonant transmission line differential sensor and a functional schematic block diagram of sensor circuitry that may be used with the sensor.

The above-described resonant transmission line sensor 102 may be used with components, and in environments, that could cause the sensor 102 to experience variations in temperature. Such temperature variations can, in many instances, be sufficient to adversely affect the accuracy of the sensor 102. Thus, the sensor 102 can also be constructed in a differential sensor configuration, to provide some temperature compensation. An exemplary embodiment of a differential sensor 1200 is shown in FIG. 12, and will now be described.

The differential sensor 1200 is configured similar to the non-differential sensor 102 depicted in FIG. 6, except that it includes two sections, a sensor section 1202 and a reference section 1204, that share a common moveable dielectric 114. Each section 1202, 1204 includes an individual conductor. Thus, the sensor section 1202 includes a sensor conductor 1206, and the reference section includes a reference conductor 1208. As with the non-differential sensor, the sensor conductor 1206 and reference conductor 1208 are each preferably embedded in a fixed dielectric 602, though the differential sensor 1200 could be implemented without the fixed dielectric 602. The sensor 1206 and reference 1208 conductors each include a driven end 1209 and 1210, respectively, and a terminal end 1212 and 1214, respectively. The driven ends 1209, 1210 are each coupled to receive a sensor drive signal, and each conductor terminal end 1212, 1214 reflects the sensor drive signal back toward it respective driven end 1209, 1210, producing a standing wave signal voltage at the respective driven end 1209, 1210. The moveable dielectric 114, at least in the depicted embodiment, is implemented as two separate moveable dielectrics 114a, 114b, that are disposed on both sides of the sensor 1206 and reference 1208 conductors, though it will be appreciated that it could be implemented as a single moveable dielectric.

Figure 13:
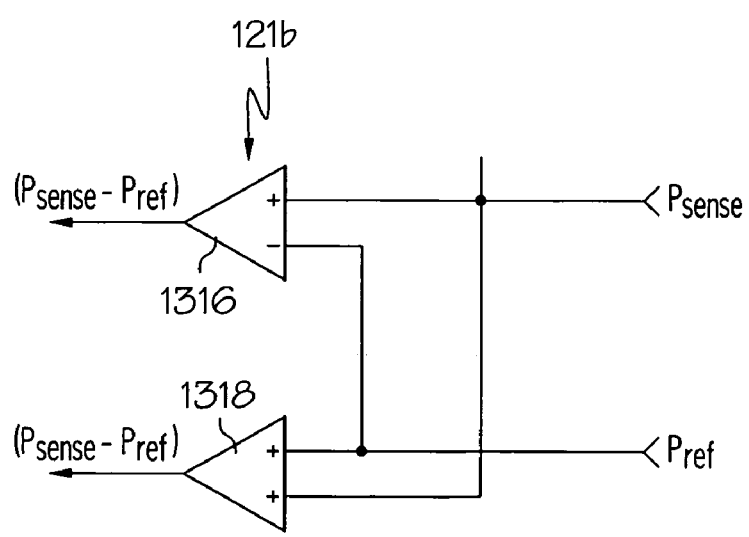
FIG. 13 is a functional schematic block diagram of an exemplary temperature compensation circuit configuration that may be used with the sensor circuitry of FIG. 10.

With the differential sensor 1200 just described, each of the sensor sections 1202, 1204 is coupled to similarly configured circuitry. Thus, as shown in FIG. 12, the sensor section 1202 and reference section 1204 are each coupled to substantially identical variable frequency sources 104, substantially identical summing circuits 106, substantially identical control circuits 108, and substantially identical position determination circuits 110. The variable frequency sources 104, summing circuits 106, control circuits 108, and position determination circuits 110 coupled to each sensor section 1202, 1204 are substantially identical as those previously described, and will therefore not be further discussed. However, as FIG. 12 also shows, a temperature compensation circuit 1216 is coupled to the output of each of the position determination circuits 110. With reference now to FIG. 13, a brief description and function of the temperature compensation circuit 1216 will now be provided.

The individual position determination circuits 110 associated with the sensor section 1202 and the reference section 1204 of the differential sensor 1200 will each supply a position signal ($P_{sense}$, $P_{ref}$) having a voltage magnitude proportional to the relative position of the moveable dielectric 114 in each sensor section 1202, 1204. The temperature compensation circuit 1216 includes a first circuit 1316 that is configured to subtract the two position signals ($P_{sense} - P_{ref}$), and a second circuit 1318 that is configured add the two position signals ($P_{sense} + P_{ref}$). In the depicted embodiment, the first circuit 1316 is implemented as a difference amplifier, and the second circuit 1318 is implemented as a summing amplifier. The difference signal ($P_{sense} - P_{ref}$) may be used to indicate moveable dielectric position since any temperature effects, which would be common to both the sensor section 1202 and reference section 1204, are eliminated. The summed signal ($P_{sense} + P_{ref}$) may be used to indicate temperature, and may also be used in one or more of the sensor system circuits to compensate for temperature effects.

Figure 14:
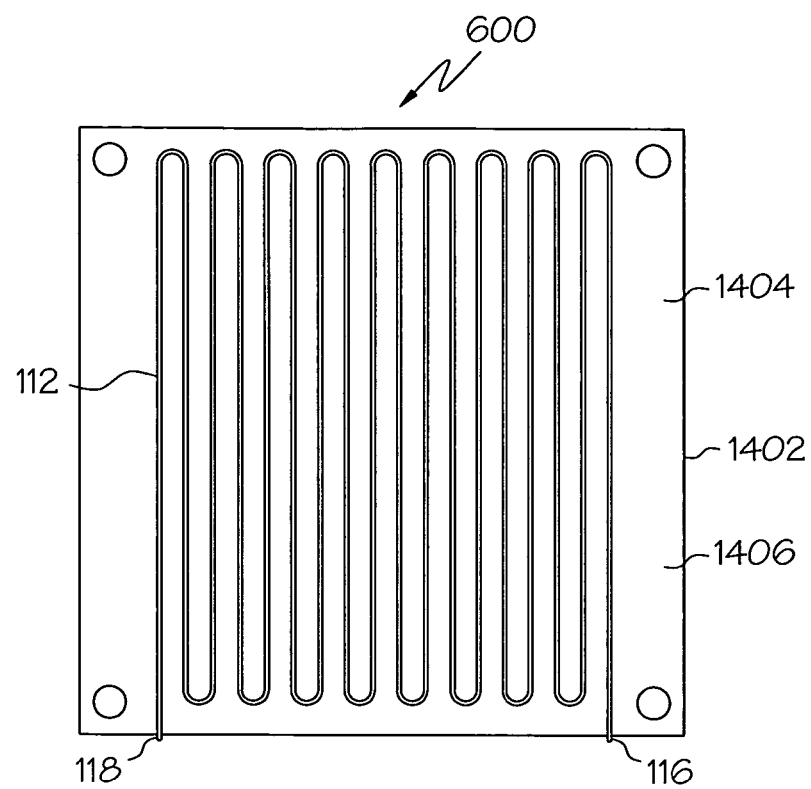
FIG. 14 shows an exemplary physical implementation of a portion of an embedded stripline module that may be used in the sensor system of FIG. 1.
Figure 15:
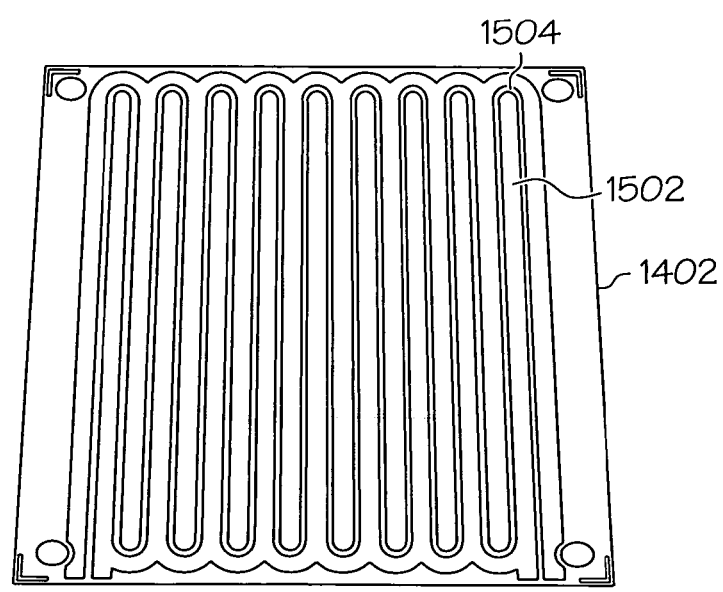
FIGS. 15–18 illustrate the process of making the module shown in FIG. 14.
Figure 16:
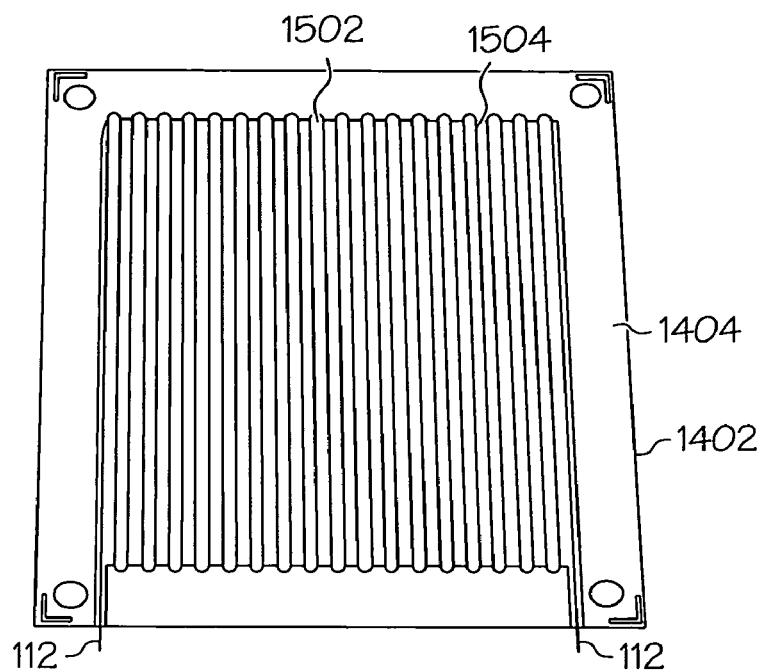

With reference now to FIGS. 14–18, a particular actual physical implementation of the stripline module 600 used in a preferred embodiment of the resonant transmission line sensor 102, its physical construction, and a preferred method of manufacturing the stripline module 600 will now be described. Turning first to FIG. 14, a physical implementation of a portion of the stripline module 600 is shown, and includes a mounting substrate 1402, and the conductor 112. The mounting substrate 1402 is preferably formed of a dielectric such as, for example, alumina, and includes a first surface 1404, and a second surface 1406.

The conductor 112, which in a particular preferred embodiment is constructed of silver, is coupled to the mounting substrate first surface 1404 and is preferably done so in a serpentine pattern. One end of the conductor 112 is used as the driven end 116, and the other end is used as the terminal end 118. The conductor 112 may be coupled to the mounting substrate first surface 1404 in any one of numerous ways, but is preferably done so by inserting the conductor 112 into one or more slots formed in a pattern that has been screen printed onto the mounting substrate first surface 1406. More particularly, and with reference to FIG. 15, the mounting substrate 1402 is shown with a pattern 1502 screen printed on the first surface 1404. In the embodiment depicted in FIG. 15, the pattern 1502 includes a single serpentine-shaped track 1504 into which the conductor 112 is inserted. This, however, is merely exemplary of one embodiment. In another embodiment, shown in FIG. 16, the pattern 1502 is formed as a plurality parallel segments, which are spaced apart from one another to form tracks 1504 into which the conductor 112 is inserted. The number of tracks 1504 may vary in either of the depicted embodiments, depending on the desired resonant frequency of the resonant transmission line sensor. For example, if a low resonant frequency is desired, more tracks 1504 are formed in the pattern 1502.

Figure 17:
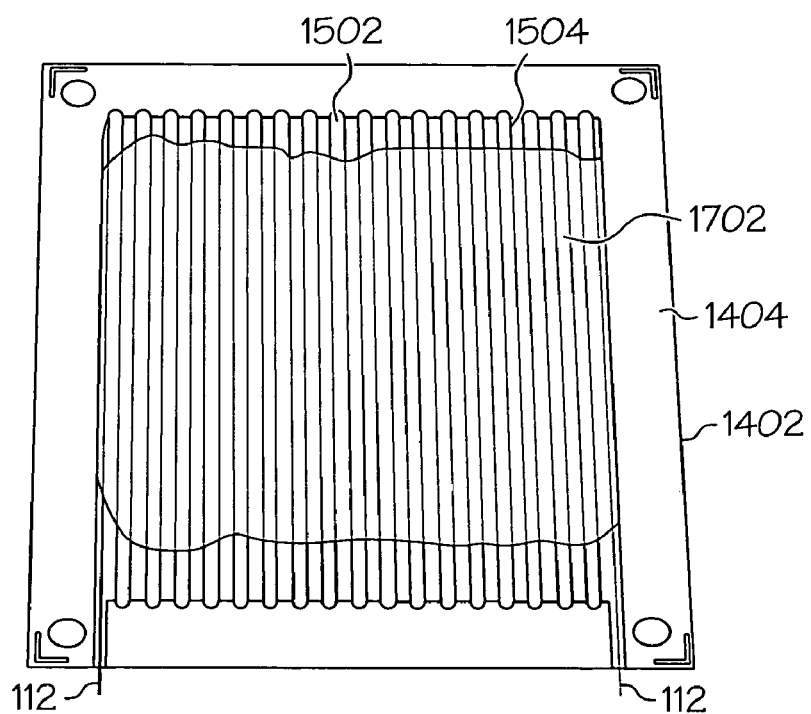
Figure 18:
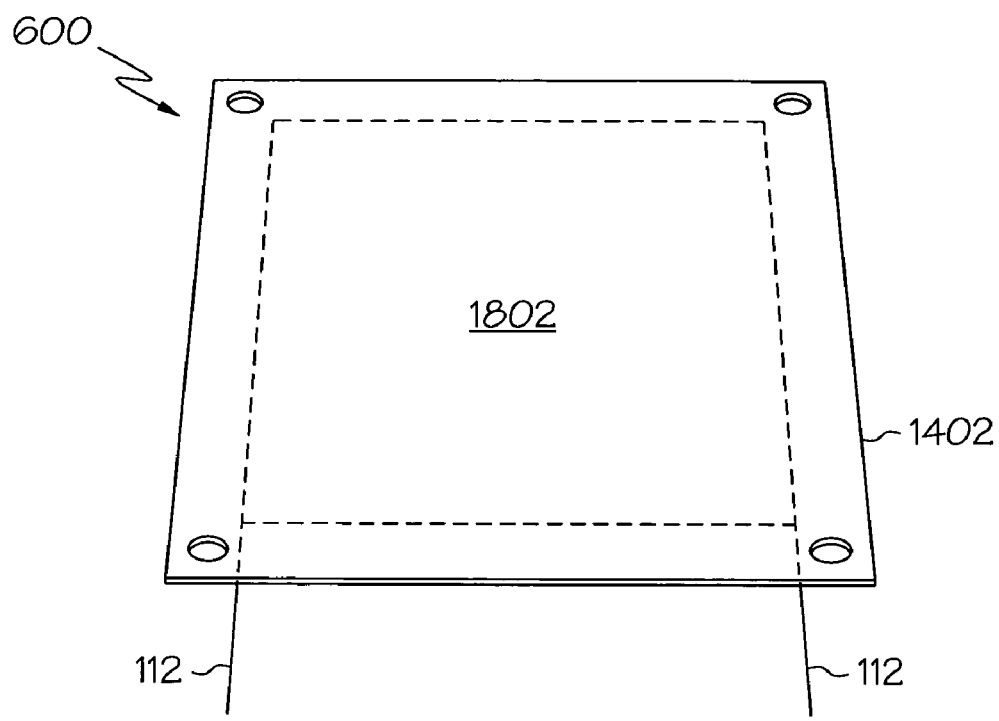

As shown in FIG. 17, after the conductor 112 is inserted into the track(s) 1504 in the pattern 1502, at least a portion of the mounting substrate first surface 1404 and/or the pattern 1502 are coated with a dielectric adhesive 1702. The adhesive 1702 may be any one of numerous dielectric adhesives, but in a preferred embodiment it is a ceramic adhesive paste sold under the trade name Cermabond 668, by Aremco Products, Inc. of Valley Cottage, N.Y. The adhesive 1702, as shown in FIG. 18, bonds a protective dielectric substrate 1802 to the mounting substrate 1402, to form the completed stripline module 600. To properly cure the adhesive 1702, the stripline module 600 is heat-treated to about 750° C., for approximately 60–120 minutes. To preserve the flatness, the stripline module 600 is preferably weighted during the heat-treatment process. It will be appreciated that the mounting substrate 1402 and protective substrate 1802 together constitute the fixed dielectric 602 into which the conductor 112 is embedded, as was previously described with reference to FIG. 6.

Figure 19:
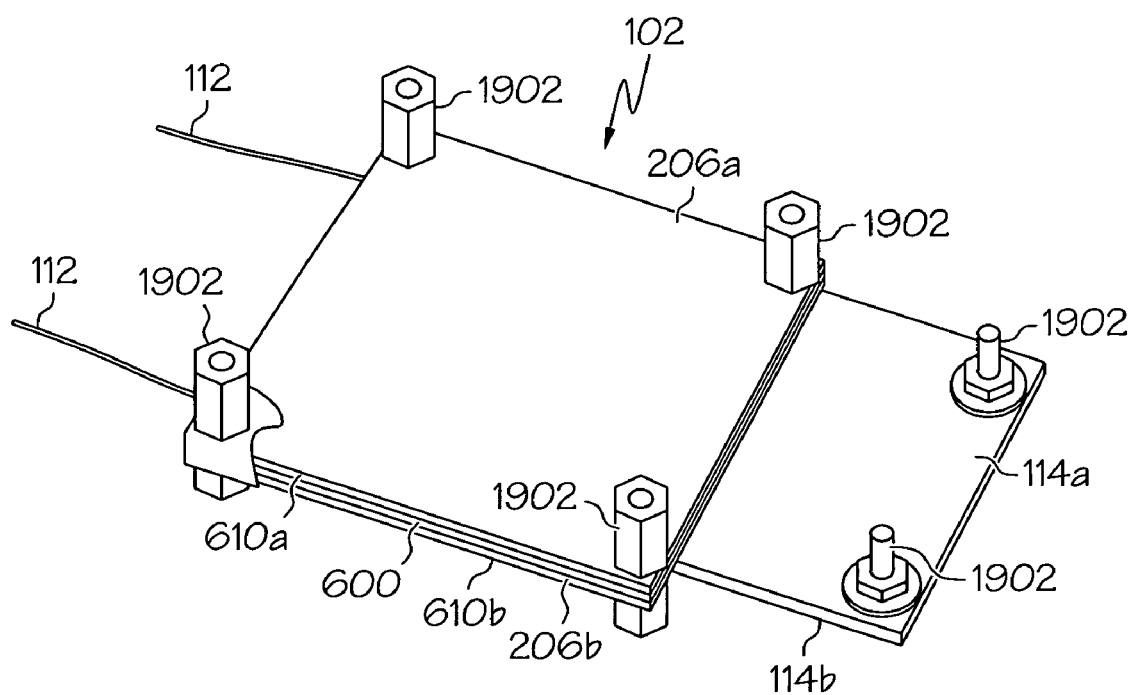
FIG. 19 depicts an exemplary physical implementation of a resonant transmission line sensor that may be used with the system of FIG. 1.

Turning now to FIG. 19, an actual physical implementation of an embodiment of a single embedded stripline resonant transmission line sensor 102 is shown. It will be appreciated that the single sensor 102 shown is representative of one-half of a differential sensor 1200. In the depicted embodiment, the ground planes 206a, 206b, and embedded stripline module 600 are coupled to one another via fasteners 1902, and are spaced apart via spacers (not shown), to form the previously described spaces 610a, 610b. The moveable dielectrics 114a, 114b, which are implemented as moveable dielectric substrates, are also coupled together via fasteners 1902 and are moveable in the spaces 610a, 610b.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A position sensing system, comprising:
a variable frequency signal source coupled to receive a frequency control signal and operable, in response thereto, to supply a sensor drive signal at a frequency;
an embedded stripline resonant transmission line sensor having one or more resonant frequencies, the transmission line sensor including first and second conductive substrates, a fixed dielectric substrate having at least a first surface and a second surface, a sensor conductor coupled to at least one of the first and second surfaces, and a moveable dielectric at least partially surrounding the sensor conductor, the moveable dielectric including a first moveable dielectric substrate disposed between the first conductive substrate and the fixed dielectric substrate first surface, a second moveable dielectric substrate disposed between the second conductive substrate and the fixed dielectric substrate second surface, the sensor conductor having a driven end coupled to receive the sensor drive signal and a terminal end configured to reflect the sensor drive signal to thereby supply a reflected signal to the driven end, the moveable dielectric configured to receive a drive force and, upon receipt thereat to move the dielectric to a position and thereby vary the one or more resonant frequencies of the transmission sensor;
a summing circuit coupled to receive the sensor drive signal and the reflected signal and operable, in response thereto, to supply a standing wave signal having an amplitude that varies with the one or more resonant frequencies of the transmission line sensor;
a control circuit coupled to receive the standing wave signal and operable, in response thereto, to (i) determine the sensor drive signal frequency relative to at least one of the transmission line sensor resonant frequencies and (ii) supply the frequency control signal to the variable frequency source, to thereby adjust the sensor drive signal frequency to substantially match at least one of the transmission line sensor resonant frequencies; and
a position determination circuit coupled to receive the adjusted sensor drive signal and operable, in response thereto, to determine the position of the moveable dielectric relative to the sensor conductor.

2. The system of claim 1, wherein the variable frequency signal source comprises a voltage controlled oscillator circuit.

3. The system of claim 1, wherein the control circuit comprises a lock-in amplifier circuit.

4. The system of claim 1, wherein the control circuit determines the sensor drive signal frequency relative to at least one of the transmission line sensor resonant frequencies by determining a derivative of the standing wave signal amplitude with respect to the sensor drive signal frequency.

5. The system of claim 1, further comprising:
a fixed-frequency signal source operable to supply a fixed-frequency modulation signal,
wherein the variable frequency source is further coupled to receive the fixed-frequency modulation signal and is further operable, in response thereto, to frequency modulate the sensor drive signal based on the fixed-frequency modulation signal.

6. The system of claim 1, wherein the summing circuit comprises:
- a first resistor coupled between the sensor conductor and the variable frequency signal source;
- a second resistor coupled between the sensor conductor and the control circuit; and
- a third resistor coupled between the sensor conductor and a circuit common.

7. The system of claim 1, wherein the position determination circuit comprises:
- a frequency to voltage converter circuit coupled to receive the adjusted sensor drive signal and operable, in response thereto, to supply a DC signal having a voltage magnitude proportional to the position of the moveable dielectric.

8. The system of claim 1, further comprising:
- a dielectric coating covering at least a portion of the fixed dielectric substrate and at least a portion of the sensor conductor.

9. The system of claim 1, further comprising:
- a dielectric coating covering at least portions of the fixed dielectric substrate, the sensor conductor, the first moveable dielectric substrate, and the second dielectric substrate.

10. The system of claim 1, wherein each of the substrates comprises alumina.

11. The system of claim 1, wherein the position determination circuit is further operable to supply a signal representative of the position of the moveable dielectric relative to the sensor conductor, and wherein the system further comprises:
- a reference variable frequency signal source coupled to receive a reference frequency control signal and operable, in response thereto, to supply a reference sensor drive signal;
- a reference transmission line sensor having one or more resonant frequencies, the reference transmission line sensor including a reference conductor and the moveable dielectric at least partially surrounding the reference conductor, the reference conductor having a driven end coupled to receive the reference sensor drive signal and a terminal end configured to reflect the reference sensor drive signal to thereby supply a reference reflected signal to the driven end, the moveable dielectric configured, upon receipt of the drive force, to move to a position and thereby vary the one or more resonant frequencies of the reference transmission sensor;
- a reference summing circuit coupled to receive the reference sensor drive signal and the reference reflected signal and operable, in response thereto, to supply a reference standing wave signal having an amplitude that varies with the one or more resonant frequencies of the reference transmission line sensor;
- a reference control circuit coupled to receive the reference standing wave signal and operable, in response thereto, to (i) determine the reference sensor drive signal frequency relative to at least one of the reference transmission line sensor resonant frequencies and (ii) supply the reference frequency control signal to the reference variable frequency source, to thereby adjust the reference sensor drive signal frequency to substantially match at least one of the reference transmission line sensor resonant frequencies;
- a reference position determination circuit coupled to receive the adjusted reference sensor drive signal and operable, in response thereto, to determine the position of the moveable dielectric relative to the reference conductor and supply a signal representative thereof; and
- a temperature compensation circuit coupled to receive the signal representative of the position of the moveable dielectric relative to the sensor conductor and the signal representative of the moveable dielectric relative to the reference conductor and operable, in response thereto, to supply a temperature compensated position signal representative of the position of the moveable dielectric relative to the sensor conductor.

12. The system of claim 11, wherein the temperature compensation circuit comprises:
- a difference amplifier coupled to receive the signal representative of the position of the moveable dielectric relative to the sensor conductor and the signal representative of the moveable dielectric relative to the reference conductor and operable, in response thereto, to supply a signal representative of a difference thereof as the temperature compensated position signal.

13. The system of claim 11, wherein the temperature compensation circuit is further operable, in response to receipt of the signal representative of the position of the moveable dielectric relative to the sensor conductor and the signal representative of the moveable dielectric relative to the reference conductor, to determine a temperature of at least the sensor conductor.

14. The system of claim 13, wherein the temperature compensation circuit comprises:
- a summing amplifier coupled to receive the signal representative of the position of the moveable dielectric relative to the sensor conductor and the signal representative of the moveable dielectric relative to the reference conductor and operable, in response thereto, to supply a signal representative of a sum thereof,
- wherein the sum signal is representative of the temperature of at least the sensor conductor.

15. A position determination system, comprising:
- a sensor variable frequency signal source and a reference variable frequency signal source, the sensor and reference variable frequency signal sources coupled to receive a sensor and a reference frequency control signal, respectively, and operable, in response thereto, to supply a sensor and a reference drive signal, respectively, at a frequency;
- a differential transmission line sensor having one or more sensor resonant frequencies and one or more reference resonant frequencies, the differential transmission line sensor including a sensor conductor, a reference conductor, and a moveable dielectric at least partially surrounding the sensor and reference conductors, the sensor and reference conductors each having a driven end coupled to receive the sensor and reference drive signals, respectively, and a terminal end configured to reflect the sensor and reference drive signals, respectively, to thereby supply a reflected sensor signal and a reflected reference signal to the sensor and reference driven ends, respectively, the moveable dielectric configured to receive a drive force and, upon receipt thereof, to move the dielectric to a position and thereby vary the one or more sensor and reference resonant frequencies of the differential transmission line sensor;
- a sensor summing circuit and a reference summing circuit, the sensor and reference summing circuits coupled to receive the sensor drive and sensor reflected signals and reference drive and reference reflected signals, respectively, and operable, in response thereto, to supply a sensor standing wave signal and a reference standing wave signal, each standing wave signal having an amplitude that varies with the one or more sensor resonant frequencies and the one or more reference resonant frequencies of the differential transmission line sensor, respectively;

a sensor and a reference control circuit, the sensor and reference control circuits coupled to receive the sensor and reference standing wave signals, respectively, and operable, in response thereto, to (i) determine the sensor and reference drive signal frequencies relative to at least one resonant frequency of the sensor and reference transmission line sensors, respectively, and (ii) supply the sensor and reference frequency control signals to the sensor and reference variable frequency sources, respectively, to thereby adjust the sensor and reference drive signal frequencies to substantially match at least one sensor and at least one reference resonant frequency, respectively, of the differential transmission line sensor;

a sensor and a reference relative position determination circuit, the sensor and reference position determination circuits each coupled to receive the adjusted sensor and reference drive signals, respectively, and operable, in response thereto, to supply a sensor and reference relative position signal, respectively, representative of moveable dielectric position relative to the sensor and reference conductor, respectively; and a position signal generation circuit coupled to receive the sensor and reference relative position signals and operable, in response thereto, to supply a temperature compensated position signal representative of the position of the moveable dielectric relative to the sensor conductor.

16. The system of claim 15, further comprising:

a temperature signal generation circuit coupled to receive the sensor and reference relative position signals and operable, in response thereto, to supply a temperature signal representative of a temperature of the differential transmission line sensor.

17. A system fox measuring temperature, comprising:

a sensor variable frequency signal source and a reference variable frequency signal source, the sensor and reference variable frequency signal sources coupled to receive a sensor and a reference frequency control signal, respectively, and operable, in response thereto, to supply a sensor and a reference drive signal, respectively, at a frequency;

a differential transmission line sensor having one or mare sensor resonant frequencies and one or more reference resonant frequencies, the differential transmission line sensor including a sensor conductor, a reference conductor, and a moveable dielectric at least partially surrounding the sensor and reference conductors, the sensor and reference conductors each having a driven end coupled to receive the sensor and reference drive signals, respectively, and a terminal end configured to reflect the sensor and reference drive signals, respectively, to thereby supply a reflected sensor signal and a reflected reference signal to the sensor and reference driven ends, respectively, the moveable dielectric configured to receive a drive force and, upon receipt thereof, to move the dielectric to a position and thereby vary the one or more sensor and reference resonant frequencies of the differential transmission line sensor;

a sensor summing circuit and a reference summing circuit, the sensor and reference summing circuits coupled to receive the sensor drive and sensor reflected signals and reference drive and reference reflected signals, respectively, and operable, in response thereto, to supply a sensor standing wave signal and a reference standing wave signal, each standing wave signal having an amplitude that varies with the one or more sensor resonant frequencies and the one or more reference resonant frequencies of the differential transmission line sensor, respectively;

a sensor and a reference control circuit, the sensor and reference control circuits coupled to receive the sensor and reference standing wave signals, respectively, and operable, in response thereto, to (i) determine the sensor and reference drive signal frequencies relative to at least one resonant frequency of the sensor and reference transmission line sensors, respectively, and (ii) supply the sensor and reference frequency control signals to the sensor and reference variable frequency sources, respectively, to thereby adjust the sensor and reference drive signal frequencies to substantially match at least one sensor and at least one reference resonant frequency, respectively, of the differential transmission line sensor;

a sensor and a reference relative position determination circuit, the sensor and reference position determination circuits each coupled to receive the adjusted sensor and reference drive signals, respectively, and operable, in response thereto, to supply a sensor and reference relative position signal, respectively, representative of moveable dielectric position relative to the sensor and reference conductor, respectively; and a position signal generation circuit coupled to receive the sensor and reference relative position signals and operable, in response thereto, to supply a temperature compensated position signal representative of the position of the moveable dielectric relative to the sensor conductor; and a temperature signal generation circuit coupled to receive the sensor and reference relative position signals and operable, in response thereto, to supply a temperature signal representative of a temperature of the differential transmission line sensor.

18. A resonant transmission line sensor, comprising:

a first conductive substrate;

a second conductive substrate;

a sensor substrate having at least a first and second surface, the sensor substrate disposed between the first and second conductive substrates;

a sensor conductor coupled to the sensor substrate first surface; and a movable dielectric disposed between the first conductive substrate and the sensor conductor, the moveable dielectric configured to receive a drive force and upon receipt thereof, to move relative to the sensor conductor, wherein the moveable dielectric comprises:
    a first moveable dielectric substrate disposed between the first conductive substrate and the sensor conductor; and
    a second moveable dielectric substrate coupled to the first moveable dielectric substrate and disposed between the second conductive substrate and the sensor substrate second surface.

19. The sensor of claim 18, wherein the sensor conductor is formed into a serpentine pattern on the sensor substrate first surface.

20. The sensor of claim 18, further comprising:
a dielectric coating covering at least a portion of the sensor dielectric substrate and at least a portion of the sensor conductor.

21. The system of claim 18, further comprising:
a dielectric coating covering at least portions of the sensor dielectric substrate, the sensor conductor, the first moveable dielectric substrate, and the second dielectric substrate.

22. The system of claim 18, wherein the sensor substrate comprises a dielectric.

23. The system of claim 22, wherein the dielectric comprises alumina.

24. The system of claim 18, wherein the sensor conductor comprises silver.

25. A method of determining a position of moveable component, comprising the steps of:
moving a dielectric in response to movement of the moveable component, the dielectric disposed within a resonant transmission line adjacent a sensor conductor, the resonant transmission line comprising a sensor section that includes the sensor conductor, and a reference section that includes a reference conductor, whereby movement of the dielectric varies an impedance and a resonant frequency of the resonant transmission line;
moving the dielectric, in response to the movement of the moveable component, relative to the reference conductor, whereby movement of the dielectric varies a resonant frequency of the resonant transmission line sensor and reference sections;
supplying a sensor drive signal to the resonant transmission line conductor, to thereby produce a reflected signal, the sensor drive signal having a frequency;
supplying a reference sensor drive signal to the reference conductor, to thereby produce a reference reflected signal the reference sensor drive signal having a frequency;
summing the sensor chive signal and the reflected signal to produce a standing wave signal;
summing the reference sensor drive signal and the reference reflected signal to produce a reference standing wave signal;
determining the sensor drive signal frequency relative to a resonant frequency of the transmission line;
determining the reference sensor drive signal frequency relative to the resonant frequency of the resonant transmission line reference section;
adjusting the sensor drive signal frequency to substantially match a resonant frequency of the transmission line;
adjusting the reference sensor drive signal frequency to substantially match a resonant frequency of the resonant transmission line reference section; and
determining the position of the moveable component based at least in part on the adjusted sensor drive signal frequency and the adjusted reference sensor drive signal frequency.

26. The method of claim 25, wherein the reflected signal has at least an amplitude, and wherein the step of determining the sensor drive signal frequency relative to a resonant frequency of the transmission line comprises:
determining a first derivative of the reflected signal amplitude with respect to the sensor drive signal frequency.

27. The method of claim 25, further comprising:
frequency modulating the sensor drive signal based on a modulation signal having a modulation frequency and phase;
detecting a phase of the reflected signal relative to the phase of the modulation signal; and
determining the sensor drive signal frequency relative to the resonant frequency of the transmission line based on the relative phases of the reflected signal and the modulation signal.

* * * * *

UNITED STATES PATENT AND TRADEMARK OFFICE
CERTIFICATE OF CORRECTION

PATENT NO. : 7,092,840 B2
APPLICATION NO. : 10/789693
DATED : August 15, 2006
INVENTOR(S) : Devlin M. Gualtieri It is certified that error appears in the above-identified patent and that said Letters Patent is hereby corrected as shown below:

Column 12, line 28, "thereat" should be changed to --thereof--;
Column 15, line 49, "mare" should be changed to --more--;
Column 18, line 1, "chive" should be changed to --drive--.

Signed and Sealed this

Twenty-seventh Day of March, 2007

JON W. DUDAS
*Director of the United States Patent and Trademark Office*